US008391251B2

(12) United States Patent
Sun et al.

(10) Patent No.: US 8,391,251 B2
(45) Date of Patent: Mar. 5, 2013

(54) TRANSMISSION METHOD FOR A TIME DIVISION DUPLEX MOBILE COMMUNICATION SYSTEM

(75) Inventors: Shaohui Sun, Shanghai (CN); Yingmin Wang, Shanghai (CN); Shiqiang Suo, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 916 days.

(21) Appl. No.: 11/996,829

(22) PCT Filed: Jul. 21, 2006

(86) PCT No.: PCT/CN2006/001796
§ 371 (c)(1),
(2), (4) Date: May 5, 2008

(87) PCT Pub. No.: WO2007/012264
PCT Pub. Date: Feb. 1, 2007

(65) Prior Publication Data
US 2008/0225802 A1 Sep. 18, 2008

(30) Foreign Application Priority Data

Jul. 25, 2005 (CN) .......................... 2005 1 0085188

(51) Int. Cl.
*H04J 3/00* (2006.01)
*H04B 7/02* (2006.01)
(52) U.S. Cl. ........................................ 370/336; 375/267
(58) Field of Classification Search ................... 370/336
See application file for complete search history.

(56) References Cited

U.S. PATENT DOCUMENTS

| 7,266,141 | B2 * | 9/2007 | Goodings ..................... 375/132 |
| 7,916,710 | B2 * | 3/2011 | Che et al. ..................... 370/345 |
| 2002/0071415 | A1 * | 6/2002 | Soulabail et al. ............. 370/337 |
| 2003/0076812 | A1 * | 4/2003 | Benedittis ..................... 370/350 |

(Continued)

FOREIGN PATENT DOCUMENTS

| CN | 1572101 | 1/2005 |
| CN | 1622502 | 6/2005 |

(Continued)

OTHER PUBLICATIONS

Extended European Search Report for corresponding European Patent Application No. 06761531.0 mailed Jun. 22, 2012.

(Continued)

*Primary Examiner* — Guang Li
(74) *Attorney, Agent, or Firm* — Merchant & Gould P.C.

(57) ABSTRACT

A method for a time division duplex mobile communication system comprises that setting a minimum unit of transmission time interval and a system frame structure, wherein each radio sub frame is composed of a downlink pilot time slot, a switching guard period, a synchronization time slot and a plurality of service time slots, and the transmission time interval uses the length of time slot as a unit; a user obtaining downlink synchronization by receiving downlink pilot information of the downlink pilot time slot, and obtaining corresponding configuration information of cell by reading cell broadcasting information, and then transmitting uplink synchronization information in the synchronization time slot to fulfill a random access process, wherein the configuration information includes transmission time interval and system frame structure information; the network side/the user transmitting call information to an opposite end, and the opposite end processing call acknowledgement according to the transmission time interval; the network side allocating a channel for the user, wherein the network side and the user communicates through the allocated channel. The method reduces data transmission delay during communication, improves call throughout.

9 Claims, 3 Drawing Sheets

U.S. PATENT DOCUMENTS

2004/0005887 A1* 1/2004 Bahrenburg et al. ....... 455/422.1
2004/0014452 A1* 1/2004 Lim et al. ..................... 455/403
2006/0176970 A1* 8/2006 Dai et al. ...................... 375/267

FOREIGN PATENT DOCUMENTS

| | | |
|---|---|---|
| EP | 1 209 938 A1 | 5/2002 |
| EP | 1 233 566 A1 | 8/2002 |
| EP | 1 511 190 A1 | 3/2005 |

OTHER PUBLICATIONS

IPWireless: "Unpaired spectrum aspects of LTE", 3GPP Draft: R1-050651, $3^{rd}$ Generation Partnership Project (3GPP), Mobile Competence Centre; 650, Route Des Lucioles; F-06921 Sophia-Antipolis Cedex; France, vol. RAN WG1, No. Sophia Antipolis, Jun. 16, 2005.

* cited by examiner

TRANSMISSION METHOD FOR A TIME DIVISION DUPLEX MOBILE COMMUNICATION SYSTEM

FIELD OF THE INVENTION

The present invention relates to a transmission method for a mobile communication system, and especially to a transmission method for a Time Division Duplex (TDD) mobile communication system with a characteristic of low delay.

BACKGROUND

With the development of society and the progress of science technology, people increase the requirement to mobile communication continuously, data transmission service with large capacity, high speed, and low delay is desirable. TD-SCDMA system is the only one to adopt TDD method among the three mainstream standards in the third generation mobile communication system, the characteristic of TD-SCDMA is that uplink and downlink are in the same frequency band, a pair of frequencies are not necessary, the spectrum can be used with a relatively large flexibility. Furthermore, uplink and downlink can be flexibly configured to support the transmission of uplink and downlink asymmetric service. TD-SCDMA adopts advanced technologies in mobile communication such as smart antenna, uplink synchronization, joint detection, and software defined radio and the like to provide relatively high performance and spectrum utilization efficiency of the system.

From the frame structure in the current TD-SCDMA system shown in FIG. 1 and FIG. 2, the frame structure in TD-SCDMA system adopts three layers structure: radio frame, sub frame and time slot. The length of each radio frame is 10 ms, divided as two 5 ms sub frames; each sub frame is composed of seven service time slots from time slot 0 to time slot 6 and three special time slots. The three special time slots are Downlink Pilot Time Slot (DwPTS), Guard Period (GP), and Uplink Pilot Time Slot (UpPTS) respectively. Wherein, DwPTS is mainly used to transmit system downlink synchronization information, GP is used to provide the time interval for switching from downlink time slot to uplink time slot, UpPTS is used to transmit uplink synchronization information of user access.

In the current TD-SCDMA system, each 5 ms radio sub frame has two uplink and downlink switching points, which are located between TS0 and TS1, and between TS3 and TS4 respectively shown in FIG. 2. Wherein, TS0 are fixedly used to transmit downlink information, TS1 are fixedly used to transmit uplink information. Therefore, the position of the first switching point is fixed between TS0 and TS1, used for switching from downlink time slot to uplink time slot. In order to obtain system uplink synchronization, a switching guard period GP is provided between uplink pilot time slot and downlink pilot time slot. Another switching point can be located between any two time slots from TS1 to TS6, the switching point is a switching point from uplink to downlink, a dedicated guard period is not necessary.

The time division duplex communication system has the communication process as following: a transmitting end encodes and modulates data according to the preset radio frame format, then the data are transmitted through radio frequency (RF), a receiving end receives RF signal, the RF signal is demodulated and decoded to obtain corresponding data, then receive acknowledgement information is transmitted to the opposite end through a channel, the transmitting end transmits the following data after receiving the acknowledgement information, by analogy, the transmitting of all data are fulfilled.

A sliding transmit window is commonly built in the transmitting end, in order to guarantee reliable and sequential transmission, the data packet from the transmitting end to the receiving end must be located within the transmit sliding window, after the transmitting end receives receive acknowledge information from the receiving end, the sliding window slides forward, the data newly entered into the window will be transmitted. If the transmitting end does not receive the acknowledgement information from the receiving end, and the data packets within transmit sliding window are all transmitted, then the transmitting end will wait for the acknowledgement information and does not transmit data any more. If waiting for the receive acknowledgement information is time out, the transmitting end will discard the packet. Time from the transmitting end transmitting data to the receiving end to the receiving end returning the receiving acknowledgement information is called transmission delay. Call throughout of the transmitting end is determined by the size of transmit sliding window in the transmitting end and the transmission delay, when the transmit sliding window is fixed, the size of call throughout is determined by transmission delay, the smaller is the transmission delay, the larger the call throughout is. In mobile communication, transmission delay is related with the length of radio data Transmission Time Interval (TTI) of air interface, the smaller is the unit length of TTI, the smaller the transmission delay is.

Meanwhile, for physical layer transmission, if the way of adaptive modulation and coding (AMC) and hybrid automatic repeat request (HARQ) are adopted, the smaller is TTI of transmission data, the shorter the delay of feedback channel quality in the receiving end is, so that the more the channel quality feedback from the receiving end approaches to the actual channel quality when transmitting, thus a higher call throughout can be achieved by adopting AMC. Meanwhile, if retransmitting is happened, since TTI is relative small, so that the retransmitting time of HARQ is reduced, and spectrum utilization efficiency is also improved. Currently for TD-SCDMA system, TTI uses frame (Release 4 version) or sub frame (HSDPA service in Release 5 version) as unit.

Next TD-SCDMA communication system is taken as an example to explain its work process. Except for TS0, the configuration between uplink service time slots and downlink service time slots is supposed to be 1:5, firstly UE builds downlink synchronization with the network side through receiving DwPTS time slot information, UE reads cell broadcasting information in TS0 to obtain corresponding configuration information. UE transmits uplink synchronization information to the network side through UpPTS time slot. After the network side receiving the uplink synchronization information of UE and building uplink synchronization, the network side transmits control information to UE, UE transmits acknowledgement information to the network side after receiving the control information. The network side allocates corresponding channel resource to UE, the network side and UE communicate through the allocated channel resource.

When the network side chooses TS2 of the nth sub frame to transmit data on TS2, UE needs to transmit receive acknowledgement information to the network side after UE receives data and processes the corresponding processing. Because the size of TTI is 5 ms, UE can not transmit acknowledgement information to the network side earlier than in TS1 time slot of the next sub frame, namely, N+1th sub frame, from TS2 time slot of Nth sub frame to TS1 of N+1th sub frame the delay is relatively large. Therefore, currently the waiting time of UE to transmit is too long, so that transmission delay is relatively long; call throughout of user will be influenced.

SUMMARY OF THE INVENTION

An objective of the present invention is to provide a transmission method for a time division duplex mobile communication system with a characteristic of low delay to solve the technology problem in the art that a transmitting end waits too long for receive acknowledgement information returned by the receiving end, so that transmission delay is too long and further affects throughout.

In order to achieve the above objective, the present invention provides a transmission method for a time division duplex mobile communication system, comprising:

(1) setting a minimum unit of transmission time interval and a system frame structure, wherein each radio sub frame is composed of a downlink pilot time slot, a switching guard period, a synchronization time slot and a plurality of service time slots, and the transmission time interval uses the length of time slot as a unit;

(2) a user obtaining downlink synchronization by receiving downlink pilot information of the downlink pilot time slot, and obtaining corresponding configuration information of cell by reading cell broadcasting information, and then transmitting uplink synchronization information in the synchronization time slot to fulfill a random access process, wherein the configuration information includes transmission time interval and system frame structure information;

(3) the network side/the user transmitting call information to an opposite end, and the opposite end processing call acknowledgement according to the transmission time interval;

(4) the network side allocating a channel for the user, wherein the network side and the user communicates through the allocated channel.

In above mentioned transmission method for a time division duplex mobile communication system, the number of the service time slots is six.

In above mentioned transmission method for a time division duplex mobile communication system, the service time slot includes a downlink time slot, and the downlink pilot time slot is located behind and neighboring to the downlink time slot, and the switching guard period is located behind and neighboring to the downlink pilot time slot.

In above mentioned transmission method for a time division duplex mobile communication system, the synchronization time slot can also be used to transmit uplink service data besides transmitting uplink synchronization information.

In above mentioned transmission method for a time division duplex mobile communication system, the service time slot is specially used to transmit service data.

In above mentioned transmission method for a time division duplex mobile communication system, the service time slot has guard time interval for switching from downlink time slot to uplink time slot.

In above mentioned transmission method for a time division duplex mobile communication system, the guard time interval used to switch from downlink time slot to uplink time slot and the service time slot length used to transmit service data in the service time slots can be adjusted according to the coverage of the system.

In above mentioned transmission method for a time division duplex mobile communication system, the service time slot has the same time slot length.

In above mentioned transmission method for a time division duplex mobile communication system, the downlink pilot time slot is used to transmit system downlink synchronization information, the switching guard period is used to provide guard time interval for switching from downlink time slot to uplink time slot.

In above mentioned transmission method for a time division duplex mobile communication system, the downlink pilot information and the uplink synchronization information can be intermittently transmitted with the period of one or more sub frames.

In above mentioned transmission method for a time division duplex mobile communication system, the transmission time interval is one time slot.

In above mentioned transmission method for a time division duplex mobile communication system, the transmitting end encodes and modulates data to be transmitted according to the frame structure and transmits the data through radio frequency, the receiving end firstly receives radio frequency signal and demodulates the signal, and decodes the signal according to the frame structure to obtain corresponding data, and then returns receive acknowledgement information according to the transmission time interval, and the transmitting end transmits the follow-up data after receiving the acknowledgement information, so as to complete the transmission of all data.

Comparing with the prior art, the present invention has advantages as following: the present invention changes the frame structure of TDD system, namely, the number of guard period can be added in each sub frame according to the requirement of delay, combining with reducing TTI unit time length of the system to reach the effect of reducing data transmission delay during communication.

The present invention defines a kind of special time slot, which can either be used as time slot transmission service data, or use part or all thereof as guard period from downlink time slot to uplink time slot in the case of a high delay requirement.

Furthermore, the present invention can intermittently transmit downlink pilot information and uplink synchronization information with the period of sub frame number, which is helpful to increase the amount of transmission data and decrease interference.

DETAILED DESCRIPTION OF THE INVENTION

The present invention will be described in detail with reference to the accompanying drawings.

Figure 1:
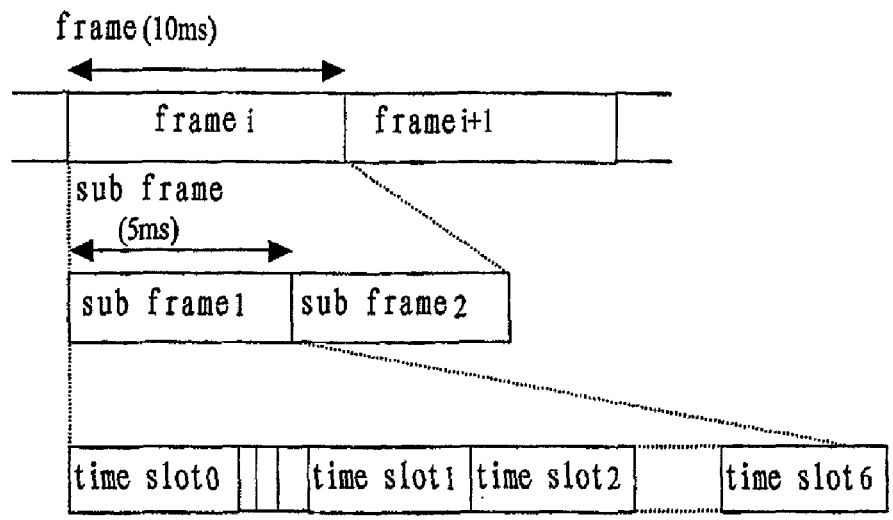
FIG. 1 is a diagram showing a frame structure in the physical layer in the current TD-SCDMA system.
Figure 2:
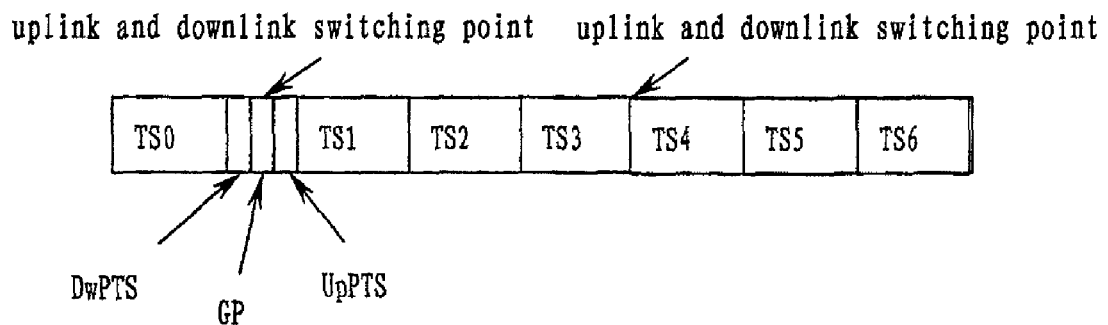
FIG. 2 is a diagram showing a sub frame time slot allocating structure in the current TD-SCDMA system.

Currently 3GPP regulations define that TTI in TD-SCDMA system uses frame or sub frame as unit. In order to reduce the transmission delay, the present invention considers reducing time length unit of TTI. For instance, TTI is set using time slot as unit to reduce acknowledge time interval. a network side and user's physical layer is supposed to adopt the frame structure disclosed in FIG. 2, although the minimum unit of TTI is a time slot, since there are little uplink and downlink switching points, the time interval of data transmission acknowledgement can not be reduced obviously. In order to acknowledge the downlink data transmitted in TS4 time slot, uplink transmitting data must be transmitted in TS1 time slot of the next radio sub frame, acknowledgement time interval is 5 ms. We can see that for transmitting data, only reducing unit time length of TTI still can not reduce acknowledgement time interval fundamentally.

Therefore, in order to reduce acknowledgement time interval, the frame structure of the system must be modified besides reducing the time length of TTI, the number of guard period is increased in the same sub frame, so that the acknowledgement time of the system is reduced.

Figure 3:
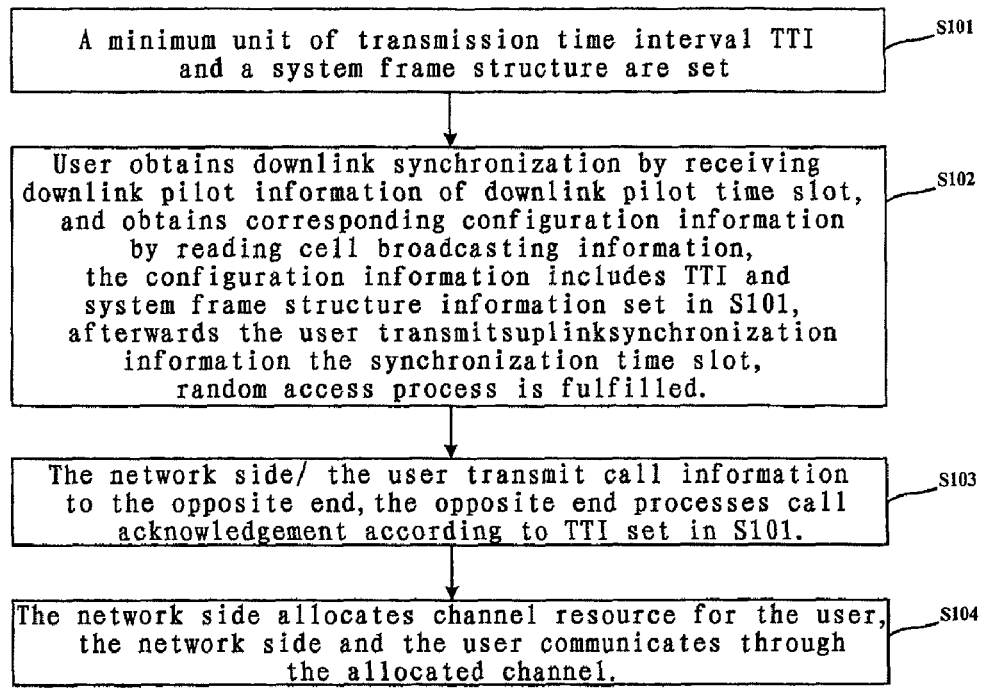
FIG. 3 is a flow chart showing a transmission method for time division duplex communication system with a characteristic of low delay disclosed in the present invention.

FIG. 3 is a flow chart showing a transmission method for time division duplex communication system with a characteristic of low delay disclosed in the present invention. It includes the following steps:

S101: A minimum unit of transmission time interval TTI and a system frame structure are set, each radio sub frame is composed of a downlink pilot time slot, a switching guard period, a synchronization time slot and a plurality of service time slots, TTI uses the length of time slot as unit;

S102: User obtains downlink synchronization by receiving downlink pilot information of downlink pilot time slot, and obtains corresponding configuration information by reading cell broadcasting information, the configuration information includes TTI and system frame structure information set in S101, afterwards the user transmits uplink synchronization information the synchronization time slot, random access process is fulfilled.

S103: The network side/the user transmit call information to the opposite end, the opposite end processes call acknowledgement according to TTI set in S101.

S104: The network side allocates channel resource for the user, the network side and the user communicates through the allocated channel.

It should be explained that in S103, if the transmitting end is the network side, then the opposite end is the user side, if the transmitting end is the user side, then the opposite end is the network side.

Figure 4:
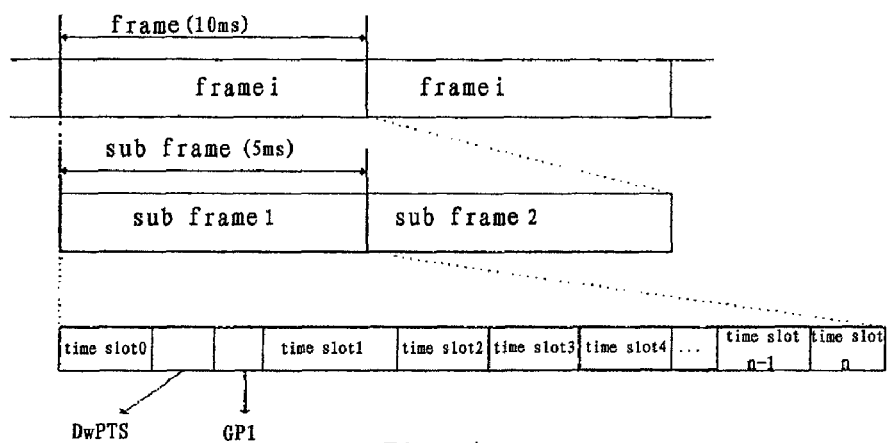
FIG. 4 is a diagram showing a frame structure in the physical layer for time division duplex communication system with a characteristic of low delay disclosed in the present invention.

FIG. 4 is a diagram showing a frame structure in the physical layer for time division duplex communication system with a characteristic of low delay disclosed in the present invention. In FIG. 4, in order to keep backward compatibility, the frame length is still 10 ms, each frame comprises two 5 ms sub frames. Each radio sub frame is composed of a downlink pilot time slot, a switching guard period, a synchronization time slot and a plurality of service time slots. The downlink pilot time slot is used to transmit system downlink synchronization information, the switching guard period is used to provide the time interval required by switching guard from downlink time slot to uplink time slot. Downlink pilot information and the uplink synchronization information can be intermittently transmitted with the period of one or more sub frame number.

The synchronization time slots set in the sub frame structure according to the present invention still can be used to transmit uplink service data besides transmitting uplink synchronization information.

The service time slots in the sub frame structure according to the present invention can be ordinary service time slots, ordinary service time slots are time slots specially used to transmit service data.

The service time slots in the sub frame structure according to the present invention can be special service time slots, the special service time slots are service slots with the guard time interval switching from downlink time slot to uplink time slot. The guard time interval used to switch from downlink time slot to uplink time slot and the service time slot length used to transmit service data in the special time slots can be adjusted according to the coverage of the system.

The service time slot in the sub frame structure according to the present invention has the same time slot length.

Transmission time interval TTI according to the present invention uses time slot as the minimum unit, the length of TTI can also use couple of time slots as unit.

Besides a fixed switching guard period GP1 in the sub frame structure set in the present invention, the number of switching guard period from downlink time slot to uplink time slot can be flexibly configured. As the length of TTI becomes shorter, the time interval returning the acknowledgement information can be reduced, moreover, the effect of reducing data transmission delay can be achieved.

Meanwhile, considering that downlink pilot information and uplink synchronization information are mainly used for UE to build synchronization with the network side, in order to reduce interference, the downlink pilot information and the uplink synchronization information can be intermittently transmitted with the period of one or more sub frame number in the sub frame structure according to the present invention.

In the set sub frame structure, Time Slot 0 (TS0) is fixed to be downlink time slot, the downlink pilot time slot is located behind TS0 and next to TS0, the switching guard period is located between the downlink pilot time slot and TS1, and next to the downlink pilot time slot.

Figure 5:
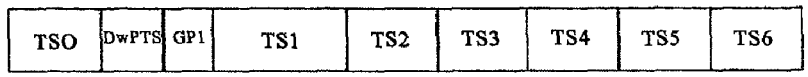
FIG. 5 is a diagram showing a sub frame time slot allocating structure according to the present invention.
Figure 6:
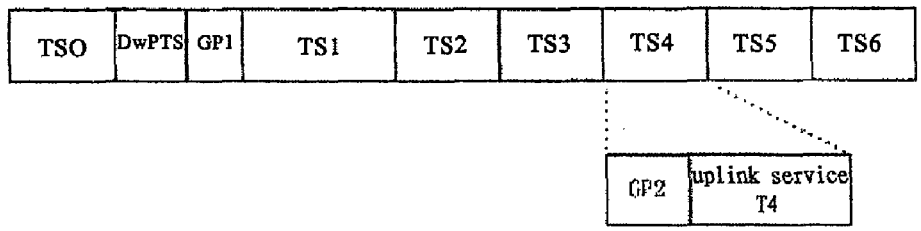
FIG. 6 is a diagram showing a special uplink time slot structure in the sub frame structure according to the present invention.
Figure 7:
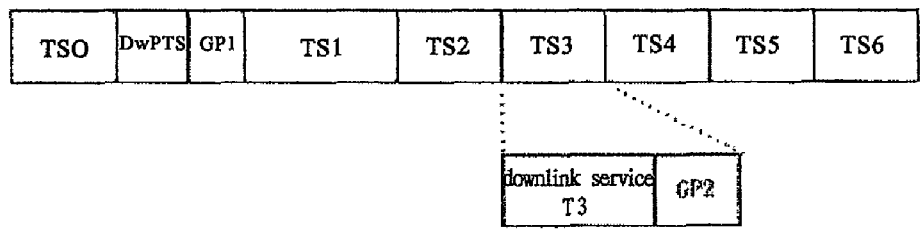
FIG. 7 is a diagram showing a special downlink time slot structure in the sub frame structure according to the present invention.

Next taking a concrete diagram of sub frame time slot allocating shown in FIG. 5, FIG. 6 and FIG. 7 as an example, a transmission method for a time division duplex communication system with characteristic of low delay is described. FIG. 5 shows a 5 ms sub frame structure, each sub frame includes seven time slots from TS0 to TS6, wherein one is uplink synchronization time slot and the other six are service time slots. The synchronization time slot can be located in any uplink time slot, wherein uplink synchronization information is included. The uplink synchronization information can be intermittently transmitted with the period of one or more sub frame number. There are two special time slots between TS0 and TS1: Downlink Pilot Time Slot (DwPTS) and switching Guard Period (GP1), wherein downlink pilot time slot is used to transmit system downlink synchronization information, the switching guard period is used to provide the guard period interval for switching from downlink time slot to uplink time slot. The downlink pilot time slot can intermittently transmit downlink pilot information with the period of one or more sub frame number. For instance, for time slots from TS0 to TS6, TS1 is a synchronization time slot, except for TS1, the other six service time slots have the same length, namely, 0.675 ms.

The length of TS1 is larger than original length of TS1 and meets the equation (1); equation (1) is shown as following:

$$GP1+TS1_N=GP+TS1_O+\text{UpPTS} \qquad (1),$$

wherein GP1 represents new switching guard period length shown in FIG. 5, $TS1_N$ represents the length of the new TS1 time slot; GP represents the original guard period length; $TS1_O$ represents the length of the original TS1 time slot; UpPTS is the length of original uplink pilot time slot. In the frame structure shown in FIG. 5, the length of GP1 and TS1 can be flexibly configured according to different cell coverage.

If service requires a strict delay, one switching point from downlink to uplink can be added. For instance, in the sub frame structure shown in FIG. 5, TS0 is fixed to be downlink time slot and TS1 is fixed to be uplink time slot; TS2 and TS3 are downlink time slots, TS3, TS5, and TS6 are uplink time slots, so that three switching points exist in the sub frame structure, the first time slot switching point is located between DwPTS and TS1 (from downlink to uplink), the second switching point is located between TS1 and TS2 (from uplink to downlink), the third switching point is located between TS3 and TS4 (from downlink to uplink), wherein the first time slot switching point and the third time slot switching point are switching points from downlink to uplink, dedicated switching guard period should be set. Wherein the first switching guard period is GP1, the second switching guard period can adopt the structure shown in FIG. 6 or FIG. 7. Wherein GP2 represents switching guard time interval from downlink time slot to uplink time slot, T4 represents service time slot part used to transmit uplink service data, T3 represents service time slot part used to transmit downlink service data. The switching guard time interval and the service time slot length can be flexibly configured according to the requirements to different coverage by the system. The larger the coverage is, the longer the switching guard time slot length is, the shorter the service time slot length is; while the smaller the coverage is, the shorter the switching guard time slot length is, the longer the service time slot length is. The sum of the switching guard time slot length and the service time slot length is a constant in each service time slot.

Figure 8:
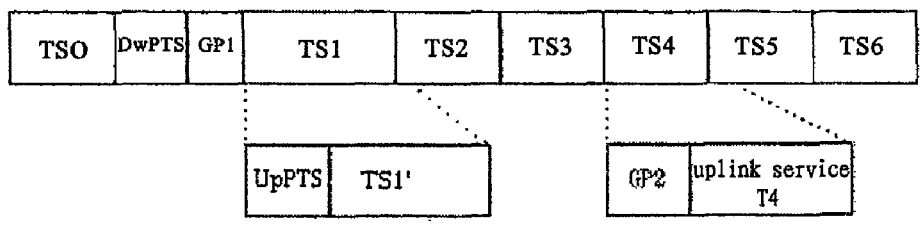
FIG. 8 is a diagram showing a concrete structure corresponding to TS1 in the sub frame structure shown in FIG. 6.
Figure 9:
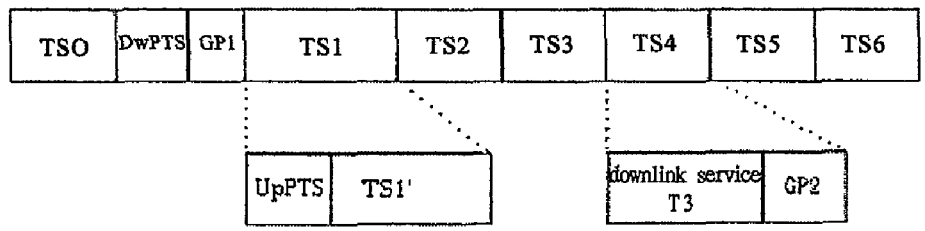
FIG. 9 is a diagram showing a concrete structure corresponding to TS1 in the sub frame structure shown in FIG. 7.

As shown in FIG. 8 and FIG. 9, when TS1 is a synchronization time slot, TS1 can transmit uplink service data besides uplink synchronization information. Here time slot TS1 can be divided to UpPTS used to transmit uplink synchronization information and TS1' used to transmit uplink service data, wherein UpPTS is located behind the first switching guard period GP1 and next to the switching guard period GP1, and TS1' is located behind UpPTS.

Next a transmission method for a time division duplex communication system with a characteristic of low delay will be described in detail. Firstly the minimum unit and system frame structure of transmission time interval TTI need to be set. User obtains downlink synchronization by receiving the downlink pilot information of DwPTS time slot, and obtains corresponding configuration information to cells by reading cell broadcasting information, the configured information include preset TTI and system frame structure information, then the user transmits uplink synchronization information in the synchronization time slot, random access process is fulfilled. The network side/the user transmit call information to the opposite end, the opposite end processes call acknowledgement according to the set TTI. The network side allocates channel resource to the user, the network side and the user communicate through the allocated channel.

During the process of data transmission, a transmitting end encodes and modulates data according to the preset radio frame format, then data are transmitted through radio frequency (RF), a receiving end receives RF signal, the RF signal is demodulated and decoded to obtain corresponding data, then receive acknowledgement information is transmit to the opposite end through a channel, the transmitting end transmits the following data after receiving the acknowledgement information, by analogy, the transmitting of all data are fulfilled.

A sliding transmit window is commonly built in the transmitting end, in order to guarantee reliable and sequential transmission, the data packet from the transmitting end to the receiving end must be located within the transmit sliding window, after the transmitting end receives receive acknowledge information from the receiving end, the sliding window slides forward, the data newly entered into the window will be transmitted. If the transmitting end does not receive the acknowledgement information from the receiving end, and the data packets within transmit sliding window are all transmitted, then the transmitting end will wait for the acknowledgement information and does not transmit data any more. If waiting for the receive acknowledgement information is time out, the transmitting end will discard the packet. Time from the transmitting end transmitting data to the receiving end to the receiving end returning the receiving acknowledgement information is called transmission delay. Call throughout of the transmitting end is determined by the size of transmit sliding window in the transmitting end and the transmission delay, and meets the following inequality (2):

$$\text{Call Throughout} \leq \text{Send\_window size/delay} \qquad (2)$$

Namely, the call throughout is determined by the size of sliding window and transmission delay.

From above description we can see that when transmit sliding window is fixed, the size of call throughout is determined by transmission delay, the smaller is transmission delay, the larger call throughout is. In mobile communication, transmission delay is related with the length of radio data transmission time interval TTI of air interface, the smaller is the unit length of TTI, the smaller the transmission delay is.

The above disclosed descriptions are only preferred embodiments of the present invention and the present invention is not limited to that, and any variations and modifications may be made without departing from the scope of the present invention by the skilled in the art.

The invention claimed is:

1. A transmission method for a time division duplex mobile communication system, comprising:
   (1) setting a minimum unit of transmission time interval and a system frame structure comprising radio sub frames, wherein each of the radio sub frames is composed of a downlink pilot time slot, a switching guard period, a synchronization time slot and a plurality of service time slots, wherein the transmission time interval uses the length of time slot as a unit and the synchronization time slot is further used to transmit uplink service data besides transmitting uplink synchronization information;
   (2) a user obtaining from a network side the downlink synchronization by receiving downlink pilot information of the downlink pilot time slot, and obtaining corresponding configuration information of cell by reading cell broadcasting information, and then transmitting uplink synchronization information in the synchronization time slot to fulfill a random access process, wherein the configuration information includes transmission time interval and system frame structure information;

(3) the network side and the user transmitting call information to one another, and each processing call acknowledgement acknowledging the call information transmitted from the other according to the transmission time interval;

(4) the network side allocating a channel for the user, wherein the network side and the user communicates through the allocated channel, wherein the service time slot has a guard time interval for switching from the downlink time slot to the uplink time slot, and wherein the guard time interval used to switch from the downlink time slot to the uplink time slot and the service time slot length used to transmit service data in the service time slots are adjusted according to the coverage of the system, thereby the sum of the guard time interval and the service time slot length is a constant.

2. The transmission method according to claim 1, wherein the number of the service time slots is six.

3. The transmission method according to claim 1, wherein the service time slot includes a downlink time slot, and the downlink pilot time slot is located behind and neighboring to the downlink time slot, and the switching guard period is located behind and neighboring to the downlink pilot time slot.

4. The transmission method according to claim 1, wherein the service time slot is specially used to transmit service data.

5. The transmission method according to claim 1, wherein the service time slots have the same time slot length.

6. The transmission method according to claim 1, wherein the downlink pilot time slot is used to transmit system downlink synchronization information, and the switching guard period is used to provide guard time interval for switching from the downlink time slot to the uplink time slot.

7. The transmission method according to claim 1, wherein the downlink pilot information and the uplink synchronization information are intermittently transmitted with a period of one or more sub frames.

8. The transmission method according to claim 1, wherein the transmission time interval is one time slot.

9. The transmission method according to claim 1, wherein the network side and the user communicates through the allocated channel comprises: the network side or the user encodes and modulates data to be transmitted according to the frame structure and transmits the data through radio frequency, the user or the network side firstly receives radio frequency signal and demodulates the signal, and decodes the signal according to the frame structure to obtain corresponding data, and then returns receive acknowledgement information according to the transmission time interval, and the network side or the user transmits the follow-up data after receiving the acknowledgement information.

* * * * *